United States Patent
Torigoe

(10) Patent No.: US 9,713,081 B2
(45) Date of Patent: Jul. 18, 2017

(54) WIRELESS ACCESS DEVICE, WIRELESS TERMINAL, PROGRAM, AND WIRELESS COMMUNICATION SYSTEM

(71) Applicant: Oki Electric Industry Co., Ltd., Tokyo (JP)

(72) Inventor: Shin Torigoe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 86 days.

(21) Appl. No.: 13/768,880

(22) Filed: Feb. 15, 2013

(65) Prior Publication Data
US 2013/0215877 A1 Aug. 22, 2013

(30) Foreign Application Priority Data
Feb. 21, 2012 (JP) ................. 2012-035109

(51) Int. Cl.
| | | |
|---|---|---|
| *H04W 48/20* | (2009.01) | |
| *H04W 84/12* | (2009.01) | |
| *H04W 84/18* | (2009.01) | |
| *H04W 48/16* | (2009.01) | |
| *H04W 48/18* | (2009.01) | |

(52) U.S. Cl.
CPC ............ *H04W 48/20* (2013.01); *H04W 48/16* (2013.01); *H04W 48/18* (2013.01); *H04W 84/12* (2013.01)

(58) Field of Classification Search
CPC ........... H04W 48/20; H04B 7/00; H04L 69/24
USPC ........................ 370/338, 310, 329
See application file for complete search history.

(56) References Cited

U.S. PATENT DOCUMENTS

| | | | | |
|---|---|---|---|---|
| 2004/0248557 A1* | 12/2004 | Muratsu | ............. | H04L 12/4641 455/411 |
| 2005/0174943 A1* | 8/2005 | Wang | .................. | H04L 12/4645 370/235 |
| 2007/0064634 A1* | 3/2007 | Huotari | ................. | H04W 48/20 370/310 |
| 2007/0081477 A1* | 4/2007 | Jakkahalli | ........... | H04L 12/4645 370/310 |
| 2008/0013487 A1* | 1/2008 | Molteni | ................ | H04L 41/048 370/329 |
| 2012/0128090 A1* | 5/2012 | Seok | ..................... | H04W 48/20 375/267 |

FOREIGN PATENT DOCUMENTS

| | | |
|---|---|---|
| JP | 2007-005892 A | 1/2007 |
| JP | 2008258666 A | 10/2008 |
| JP | 2010-288120 A | 12/2010 |

OTHER PUBLICATIONS

Fumihiko Kubota. *TCP/IP nokisokara LAN kankyonokochikujyutu Web browser ya streaming noshikumimade zettaiosaeteokitai point wokanzenkaisetsu! Network nokisochisiki 2009 PC Japan*, vol. 14, No. 1, Japan, SB Creative Corp., Dec. 16, 2008, vol. 14, pp. 30-37.

\* cited by examiner

*Primary Examiner* — Andrew Chriss
*Assistant Examiner* — Voster Preval
(74) *Attorney, Agent, or Firm* — Rabin & Berdo, P.C.

(57) ABSTRACT

There is provided a wireless access device including a wireless transmitter/receiver configured to receive a wireless signal including a network identifier, and a setting processing part configured to extract the network identifier from the wireless signal received by the wireless transmitter/receiver and to set a logical network identified by the network identifier.

13 Claims, 7 Drawing Sheets

FIG. 7

| UNIQUE SSID | UNIQUE ADDRESS SPACE | NAT CAPABILITY | RADIO WAVE OUTPUT |
|---|---|---|---|
| Alpha | 192.168.0.0/24 | ✓ | WEAK |
| Bravo | 192.168.0.1/24 | × | MEDIUM |
| Charlie | 192.168.0.2/24 | ✓ | STRONG |

WIRELESS ACCESS DEVICE, WIRELESS TERMINAL, PROGRAM, AND WIRELESS COMMUNICATION SYSTEM

CROSS REFERENCE TO RELATED APPLICATION(S)

This application is based upon and claims benefit of priority from Japanese Patent Application No. 2012-035109, filed on Feb. 21, 2012, the entire contents of which are incorporated herein by reference.

BACKGROUND

The present invention relates to a wireless access device, a wireless terminal, a program, and a wireless communication system.

In recent years, with the explosive spread of a wireless local area network (LAN), a wireless communication technology has been strengthened not only in terms of speeding up of communication rate, but also in terms of a connection distance. With the strengthening of the wireless communication technology, an environment has been improved, in which the wireless LAN can be easily used in homes and companies, and also in lobbies and rest areas of public spaces such as airports and shopping malls.

Further, under the wireless LAN environment that has been improved, a tenant and an event trader of an airport and a shopping mall are each capable of building a unique wireless LAN environment and providing a customer with a special wireless connection service under the unique wireless LAN environment.

On the other hand, for example, in the case where there are too many wireless LAN access points within limited space, the situation may occur where a wireless terminal is connected to an unintended spot by automatic switchover or the like based on the priority order or radio wave intensity of wireless LAN access points. Further, the situation may occur where a connection established between a wireless LAN access point and a wireless terminal at one location is maintained even after the wireless terminal is moved to another location. Accordingly, it is difficult for a user to connect the wireless terminal to a wireless LAN as intended by the user, or to intentionally connect the wireless terminal to the wireless LAN access point that provides a special service desired by the user.

In the future, it is expected that the cost of using a service and a service to be provided will differ for each wireless LAN access point. Accordingly, under the situation where multiple wireless LAN access points are present, a technique is necessary, which controls connection and disconnection of each of the multiple wireless LAN access points to the wireless terminal for each location of the wireless terminal.

JP 2008-258666A discloses technology in which a wireless terminal using a wireless LAN determines a destination wireless LAN access point from one or more pieces of wireless LAN access point information on the basis of conditions such as radio wave intensity and communication rate, based on the position information of the wireless terminal using a global positioning system (GPS) or the like.

SUMMARY

However, in the future, increase in the number of wireless LAN access points in the public spaces may bring a state where a communication quality in a wireless environment is deteriorated and it may become difficult to communicate with a wireless LAN access point. Those obstacles are not avoided by using the technology disclosed in JP 2008-258666A, and there remains a task that it is necessary to adjust and continue managing a network identifier to be used for each wireless LAN access point.

In light of the foregoing, it is desirable to provide technology capable of reducing deterioration in communication quality even under the situation where the number of wireless LAN access points increases.

According to an embodiment of the present invention, there is provided a wireless access device which includes a receiver configured to receive a wireless signal including a network identifier, and a setting processing part configured to extract the network identifier from the wireless signal received by the receiver and to set a logical network identified by the network identifier.

The receiver may receive the wireless signal transmitted from a wireless terminal. The setting processing part may set the logical network used for wireless communication performed by the wireless terminal.

The receiver may receive a wireless signal including segment identification information for identifying a virtual segment used for wireless communication performed by the wireless terminal in a network. The setting processing part may set a virtual segment identified by the segment identification information included in the wireless signal received by the receiver.

The wireless access device may further include an external network communication part configured to communicate via an external network, and a communication control part configured to control communication via the external network which takes place in wireless communication performed by the wireless terminal based on communication control information, in a case where a wireless signal including the communication control information for controlling communication via the external network is received by the receiver.

The receiver may receive a wireless signal including radio wave intensity used for wireless communication. The setting processing part may adjust radio wave intensity used for wireless communication based on the radio wave intensity included in the wireless signal received by the receiver.

According to another embodiment of the present invention, there is provided a wireless terminal which includes a receiver configured to wirelessly receive distribution information including a network identifier and device identification information for identifying a wireless access device, an extraction part configured to extract the network identifier and the device identification information from the distribution information received by the receiver, and a transmitter configured to transmit a wireless signal including the network identifier extracted by the extraction part to a wireless access device identified by the device identification information extracted by the extraction part.

According to another embodiment of the present invention, there is provided a program for causing a computer to function as a wireless terminal, which includes an extraction part configured to extract a network identifier and device identification information for identifying a wireless access device from distribution information which is wirelessly received, and a communication control part configured to control a transmitter to transmit a wireless signal including the network identifier extracted by the extraction part to a wireless access device identified by the device identification information extracted by the extraction part.

According to another embodiment of the present invention, there is provided a wireless communication system including a connection control device, a wireless terminal, and a wireless access device. The connection control device includes a transmitter configured to wirelessly transmit distribution information including a network identifier and device identification information for identifying a wireless access device. The wireless terminal includes a receiver configured to wirelessly receive the distribution information from the connection control device, an extraction part configured to extract the network identifier and the device identification information from the distribution information received by the receiver, and a transmitter configured to transmit a wireless signal including the network identifier extracted by the extraction part to a wireless access device identified by the device identification information extracted by the extraction part. The wireless access device includes a receiver configured to receive the wireless signal, and a setting processing part configured to extract the network identifier from the wireless signal received by the receiver and to set a logical network identified by the network identifier.

According to the embodiments of the present invention described above, it becomes possible to reduce deterioration in communication quality even under the situation where the number of wireless LAN access points increases.

BRIEF DESCRIPTION OF THE DRAWINGS

FIG. 7 is a diagram showing a configuration example of unique wireless setting information.

DETAILED DESCRIPTION OF THE EMBODIMENT(S)

Figure 1:
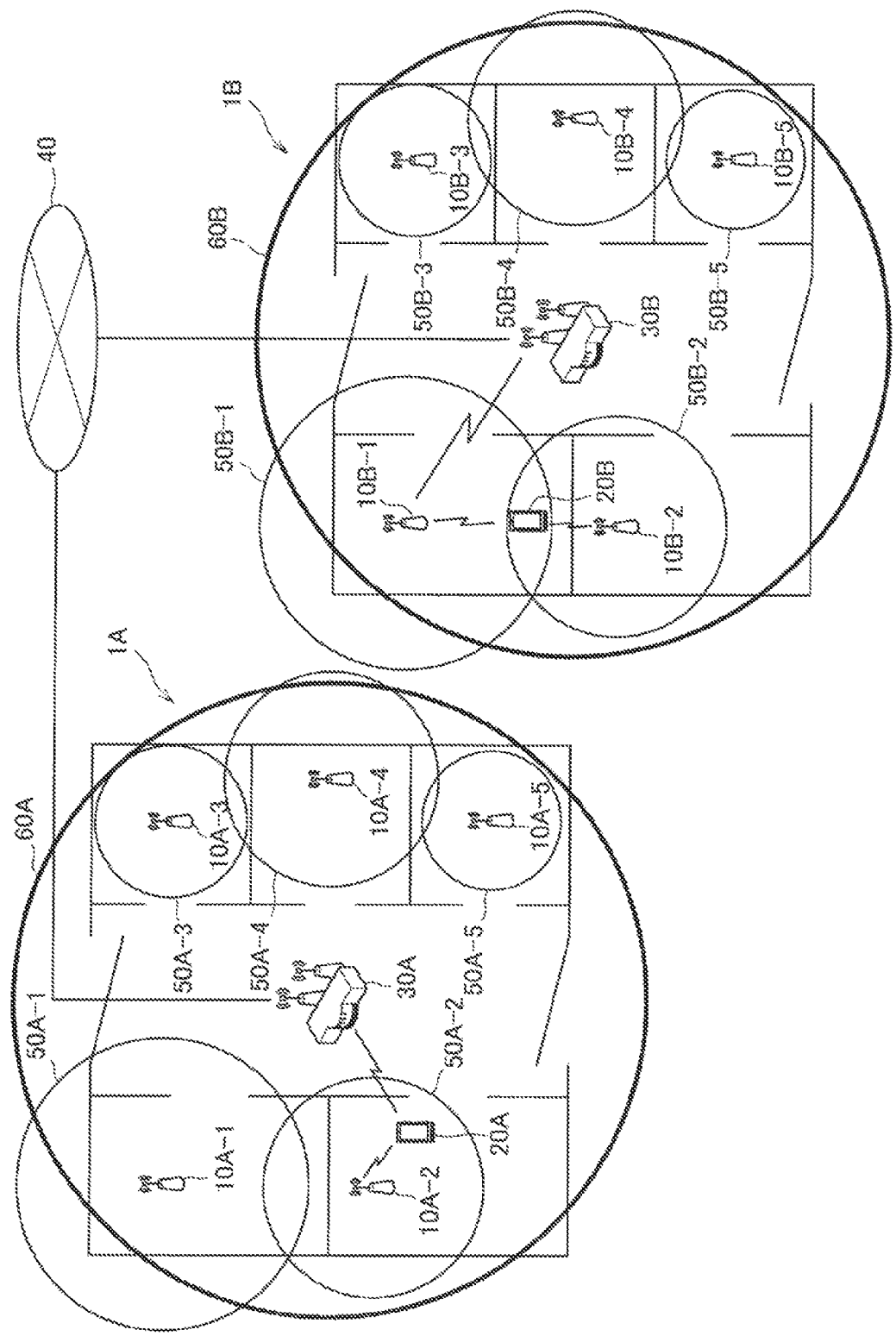
FIG. 1 is a diagram showing a configuration example of a wireless communication system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in this specification and the appended drawings, there are some cases where multiple structural elements that have substantially the same function and structure are distinguished from one another by being denoted with different alphabets after the same reference numeral. Note that, in the case where it is not necessary to distinguish the multiple structural elements that have substantially the same function and structure from one another, the multiple structural elements are denoted with the same reference numeral only.

[Configuration Example of Wireless Communication System]

FIG. 1 is a diagram showing a configuration example of a wireless communication system according to an embodiment of the present invention. With reference to FIG. 1, a configuration example of a wireless communication system according to an embodiment of the present invention will be described.

In the example shown in FIG. 1, as a wireless communication system 1, there are shown as examples a wireless communication system 1A and a wireless communication system 1B, but the number of the wireless communication systems 1 is not particularly limited. Further, the wireless communication system 1 includes multiple connection control devices 10, a wireless terminal 20, and a wireless access device 30. Further, as shown in FIG. 1, the wireless access device 30 included in each wireless communication system 1 is connected to a network 40, but the connection to the network 40 is not necessary, or each wireless access device 30 may be connected to multiple networks 40.

In the example shown in FIG. 1, the wireless communication system 1A includes connection control devices 10A-1 to 10A-5, a wireless terminal 20A, and a wireless access device 30A, and the wireless communication system 1B includes connection control devices 10B-1 to 10B-5, a wireless terminal 20B, and a wireless access device 30B. However, the number of connection control devices 10 that each wireless communication system 1 includes is not particularly limited.

The multiple connection control devices 10 and the wireless access device 30 included in each wireless communication system 1 each function as a wireless local area network (LAN) access point which wirelessly communicates with the wireless terminal 20 in the case where the wireless terminal 20 is present within an area in which wireless communication is possible with the multiple connection control devices 10 and the wireless access device 30. Although the wireless communication system 1 is installed in public spaces such as an airport and a shopping mall, the location in which the wireless communication system 1 is installed is not particularly limited.

As shown in FIG. 1, for example, in the case where the wireless communication system 1 is installed in a shopping mall, the connection control device 10 is installed in a shop within the shopping mall, and the location in which the connection control device 10 is installed is also not particularly limited. Accordingly, in the case where the wireless communication system 1 is installed in an airport, the connection control device 10 may be installed in a lobby and a rest area within the airport, for example. In addition, the connection control device 10 may also be installed in a time-limited shop, for example, may be installed for each event trader. Further, the connection control device 10 may be a dedicated device having functions as described in the present specification, or may be a device which is a computer (for example, computer connected to another computer via a LAN or the like) that is already installed and has the functions added thereto.

The wireless terminal 20 is a terminal which receives a service provided by a wireless LAN access point. Here, we assume that the wireless terminal 20 is a terminal carried by a user, but may also be a terminal carried by an employee of a tenant or a desktop terminal. The wireless terminal 20 may be a dedicated terminal having functions as described in the present specification, or may be a terminal which is a mobile phone or a smartphone having the functions added thereto.

As shown in FIG. 1, for example, in the case where the wireless communication system 1 is installed in a shopping mall, the wireless access device 30 is installed on an open passage within the shopping mall, and the location in which the wireless access device 30 is installed is also not particularly limited. Accordingly, in the case where the wireless communication system 1 is installed in an airport, the wireless access device 30 may be installed in an open lobby within the airport, for example. The wireless access device 30 functions as a representative wireless LAN access point of the multiple connection control devices 10.

The area in which the wireless communication is possible between the connection control device 10 and the wireless terminal 20 can be represented by a cell 50, and for example, in the example shown in FIG. 1, the areas in which the wireless communication is possible between the respective connection control devices 10A-1 to 10A-5 and the wireless terminal 20A are represented by cells 50A-1 to 50A-5, respectively. Further, the areas in which the wireless communication is possible between the respective connection control devices 10B-1 to 10B-5 and the wireless terminal 20B are represented by cells 50B-1 to 50B-5.

Further, the areas in which the wireless communication is possible between the wireless access device 30 and the wireless terminal 20 can be represented by a cell 60, and for example, in the example shown in FIG. 1, the area in which the wireless communication is possible between the wireless access device 30A and the wireless terminal 20A is represented by a cell 60A. Further, the area in which the wireless communication is possible between the wireless access device 30B and the wireless terminal 20B is represented by a cell 60B.

In the case where, as shown in FIG. 1, a user carrying the wireless terminal 20A moves and the wireless terminal 20A is present within the cell 50A-2, for example, the wireless terminal 20A can wirelessly communicate with the connection control device 10A-2. On the other hand, as shown in FIG. 1, a user carrying the wireless terminal 20B moves and the wireless terminal 20B is present within the 50B-1 and within the cell 50B-2, for example, the wireless terminal 20B wirelessly communicates with the connection control devices 10B-1 and 10B-2.

In this way, we assume that the wireless terminal 20 is present within the multiple cells 50, but in the case where the connection control device 10 is a wireless access device, it is expected that with increase of the number thereof, the communication quality between the wireless access device and the wireless terminal 20 deteriorates. Accordingly, in an embodiment of the present invention, described is technology which uses the connection control device 10 and the wireless access device 30, and to thereby reduce the deterioration in communication quality between the wireless access device and the wireless terminal 20 even under the situation where the number of wireless access devices increases, the wireless access devices causing a large number of overlappings of cells 50.

[Configuration Example of Each Device]

Figure 2:
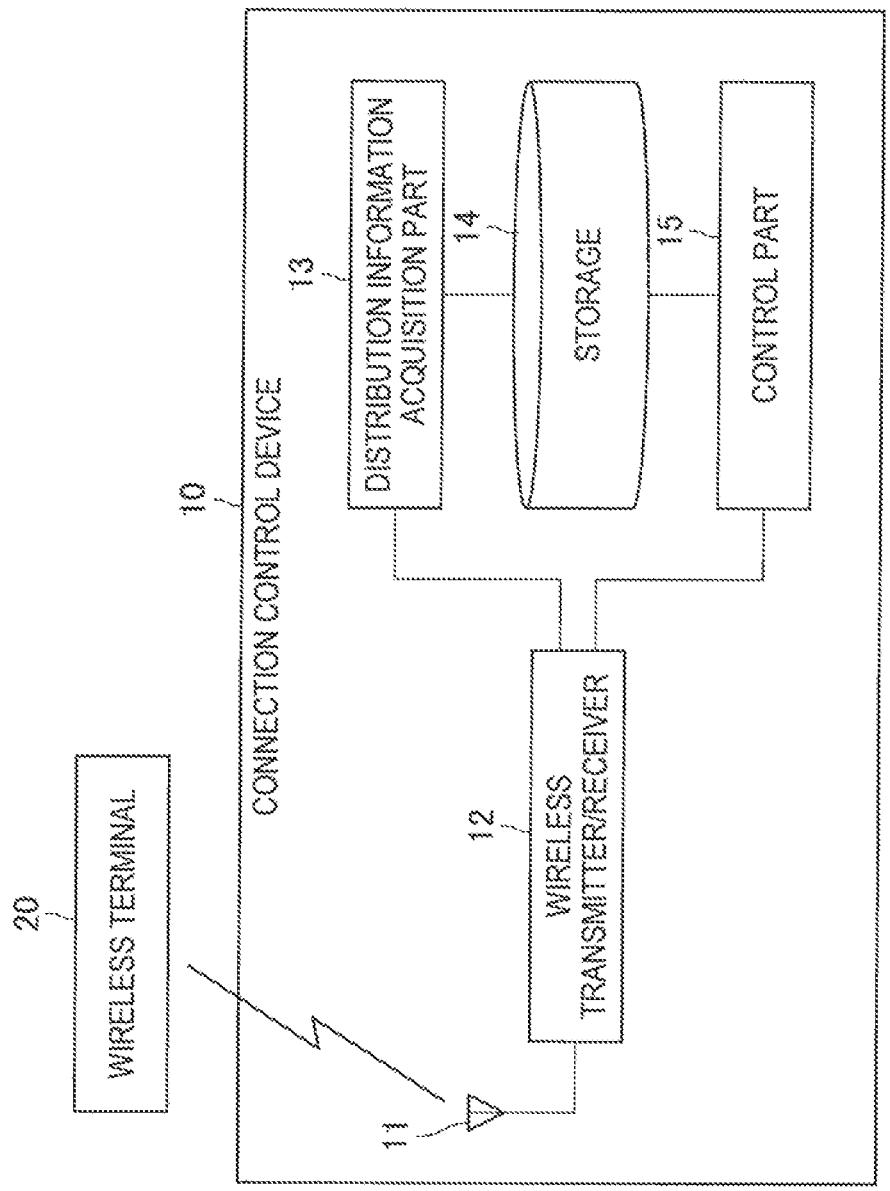
FIG. 2 is a diagram showing a functional configuration example of a connection control device included in the wireless communication system.

First, there will be described a functional configuration of a connection control device 10 included in the wireless communication system 1 according to an embodiment of the present invention. FIG. 2 is a diagram showing a functional configuration example of a connection control device 10 included in the wireless communication system 1. As shown in FIG. 2, the connection control device 10 includes an antenna 11, a wireless transmitter/receiver 12, a distribution information acquisition part 13, a storage 14, and a control part 15.

The antenna 11 has a function of emitting radio waves into space using electromagnetic energy output from the wireless transmitter/receiver 12, and a function of outputting electromagnetic energy to the wireless transmitter/receiver 12 using radio waves received from space. Note that, here, a single antenna 11 has the function of emitting radio waves and the function of receiving radio waves, but different antennas may have those functions, respectively.

The wireless transmitter/receiver 12 functions as a transmitter which has a function of transmitting a wireless signal to the wireless terminal 20 via the antenna 11, and a function of transmitting a wireless signal to the wireless access device 30 via the antenna 11. Further, the wireless transmitter/receiver 12 functions as a receiver which has a function of receiving a wireless signal from the wireless terminal 20 via the antenna 11, and a function of receiving a wireless signal from the wireless access device 30 via the antenna 11. The wireless signal received by the wireless transmitter/receiver 12 is output to the control part 15.

The storage 14 can store a program for causing the distribution information acquisition part 13 and the control part 15 to operate, and data. Further, the storage 14 can also temporarily store various types of data necessary for processes of operation of the distribution information acquisition part 13 and the control part 15. The storage 14 may be built into the connection control device 10, or may be present outside the connection control device 10.

The distribution information acquisition part 13 and the control part 15 each include a central processing unit (CPU) and a random access memory (RAM), for example, and the functions thereof may be realized by the program stored in the storage 14 being developed in the RAM and executed by the CPU. Alternatively, the distribution information acquisition part 13 and the control part 15 may each include dedicated hardware, or may each include a combination of multiple pieces of hardware.

Figure 3:
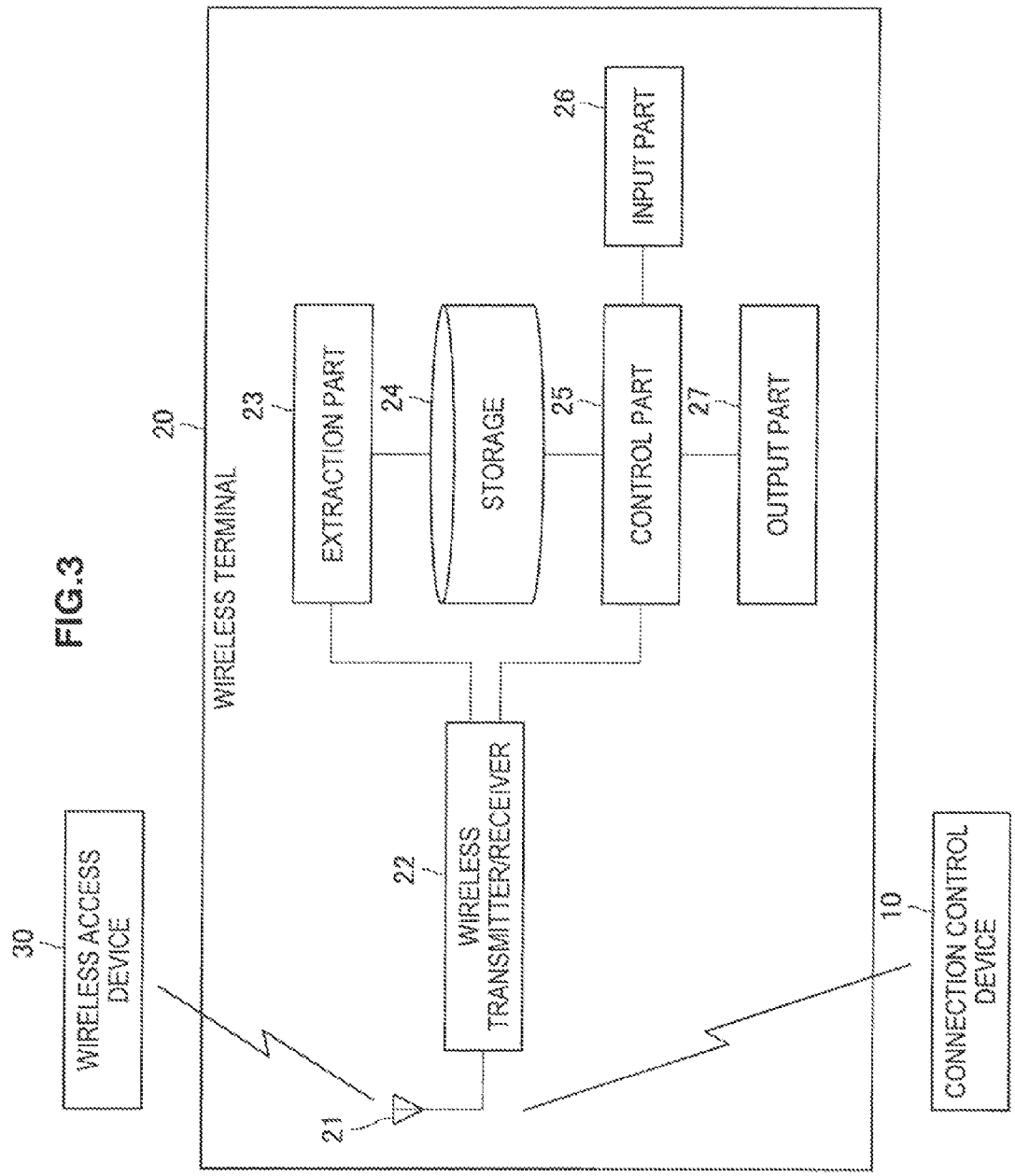
FIG. 3 is a diagram showing a functional configuration example of a wireless terminal included in the wireless communication system.

FIG. 3 is a diagram showing a functional configuration example of the wireless terminal 20 included in the wireless communication system 1. As shown in FIG. 3, the wireless terminal 20 includes an antenna 21, a wireless transmitter/receiver 22, an extraction part 23, a storage 24, a control part 25, an input part 26, and an output part 27.

The antenna 21 has a function of emitting radio waves into space using electromagnetic energy output from the wireless transmitter/receiver 22, and a function of outputting electromagnetic energy to the wireless transmitter/receiver 22 using radio waves received from space. Note that, here, a single antenna 21 has the function of emitting radio waves and the function of receiving radio waves, but different antennas may have those functions, respectively.

The wireless transmitter/receiver 22 functions as a transmitter which has a function of transmitting a wireless signal to the connection control device 10 via the antenna 21, and a function of transmitting a wireless signal to the wireless access device 30 via the antenna 21. Further, the wireless transmitter/receiver 22 functions as a receiver which has a function of receiving a wireless signal from the connection control device 10 via the antenna 21, and a function of receiving a wireless signal from the wireless access device 30 via the antenna 21. The wireless signal received by the wireless transmitter/receiver 22 is output to the control part 25.

The storage 24 can store a program for causing the extraction part 23 and the control part 25 to operate, and data. Further, the storage 24 can also temporarily store various types of data necessary for processes of operation of the extraction part 23 and the control part 25. The storage 24 may be built into the wireless terminal 20, or may be present outside the wireless terminal 20.

The extraction part 23 and the control part 25 each include a CPU and a RAM, for example, and the functions thereof may be realized by the program stored in the storage 24 being developed in the RAM and executed by the CPU. Alternatively, the extraction part 23 and the control part 25 may each include dedicated hardware, or may each include a combination of multiple pieces of hardware.

The input part 26 has a function of accepting an input of operation performed by a user of the wireless terminal 20. The operation the input of which is accepted by the user of the input part 26 is output to the control part 25. For example, the input part 26 may include any hardware, may include a touch panel and a pointing device such as a mouse, may include a button, and may include a keyboard.

The output part 27 has a function of outputting a service provided from the connection control device 10 or a service provided via the wireless access device 30. For example, in the case where image data is provided as a service, the output part 27 can display the provided image data. In this case, the output part 27 may include a display device. Further, in the case where audio data is provided as a service, the output part 27 can output the provided audio data. In this case, the output part 27 may include an audio output device.

Figure 4:
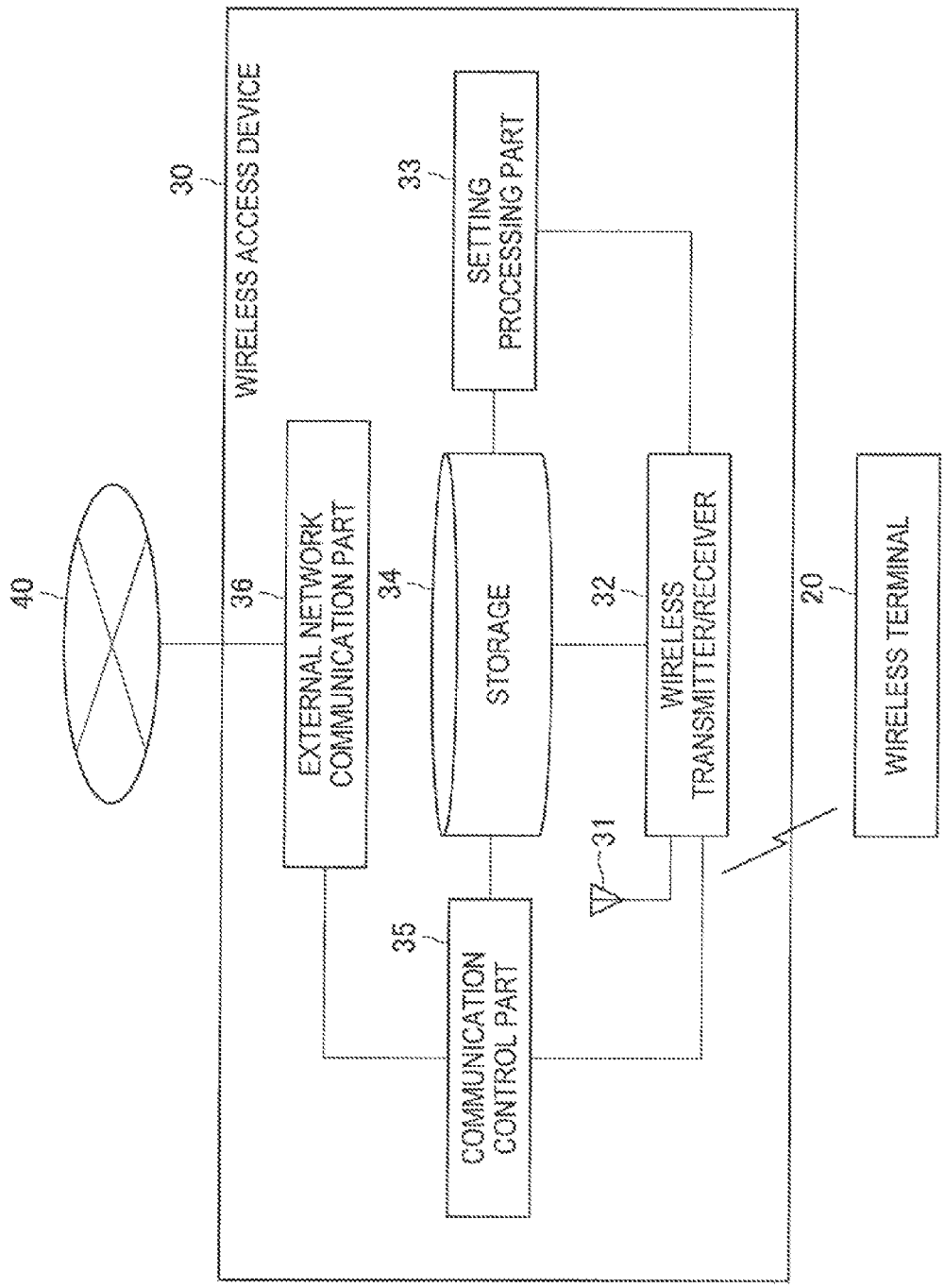
FIG. 4 is a diagram showing a functional configuration example of a wireless access device included in the wireless communication system.

FIG. 4 is a diagram showing a functional configuration example of the wireless access device 30 included in the wireless communication system 1. As shown in FIG. 4, the wireless access device 30 includes an antenna 31, a wireless transmitter/receiver 32, a setting processing part 33, a storage 34, a communication control part 35, and an external network communication part 36.

The antenna 31 has a function of emitting radio waves into space using electromagnetic energy output from the wireless transmitter/receiver 32, and a function of outputting electromagnetic energy to the wireless transmitter/receiver 32 using radio waves received from space. Note that, here, a single antenna 31 has the function of emitting radio waves and the function of receiving radio waves, but different antennas may have those functions, respectively.

The wireless transmitter/receiver 32 functions as a transmitter which has a function of transmitting a wireless signal to the connection control device 10 via the antenna 31, and a function of transmitting a wireless signal to the wireless terminal 20 via the antenna 31. Further, the wireless transmitter/receiver 32 functions as a receiver which has a function of receiving a wireless signal from the connection control device 10 via the antenna 31, and a function of receiving a wireless signal from the wireless terminal 20 via the antenna 31. The wireless signal received by the wireless transmitter/receiver 32 is output to the setting processing part 33 or the communication control part 35.

The storage 34 can store a program for causing the setting processing part 33 and the communication control part 35 to operate, and data. Further, the storage 34 can also temporarily store various types of data necessary for processes of operation of the setting processing part 33 and the communication control part 35. The storage 34 may be built into the wireless access device 30, or may be present outside the wireless access device 30.

The setting processing part 33 and the communication control part 35 each include a CPU and a RAM, for example, and the functions thereof may be realized by the program stored in the storage 34 being developed in the RAM and executed by the CPU. Alternatively, the setting processing part 33 and the communication control part 35 may each include dedicated hardware, or may each include a combination of multiple pieces of hardware.

The external network communication part 36 has a function of communicating with another device that is connected to a network 40 via the network 40. For example, the network 40 is the Internet, and the external network communication part 36 may have a function of performing network address translation (NAT) which permits communication carrying out translation between a global address and a private address in the network. Hereinafter, in order to distinguish the network 40 from a wireless LAN, in particular, the network 40 may be referred to as external network.

[Operation Example of Wireless Communication System]

Figure 5:
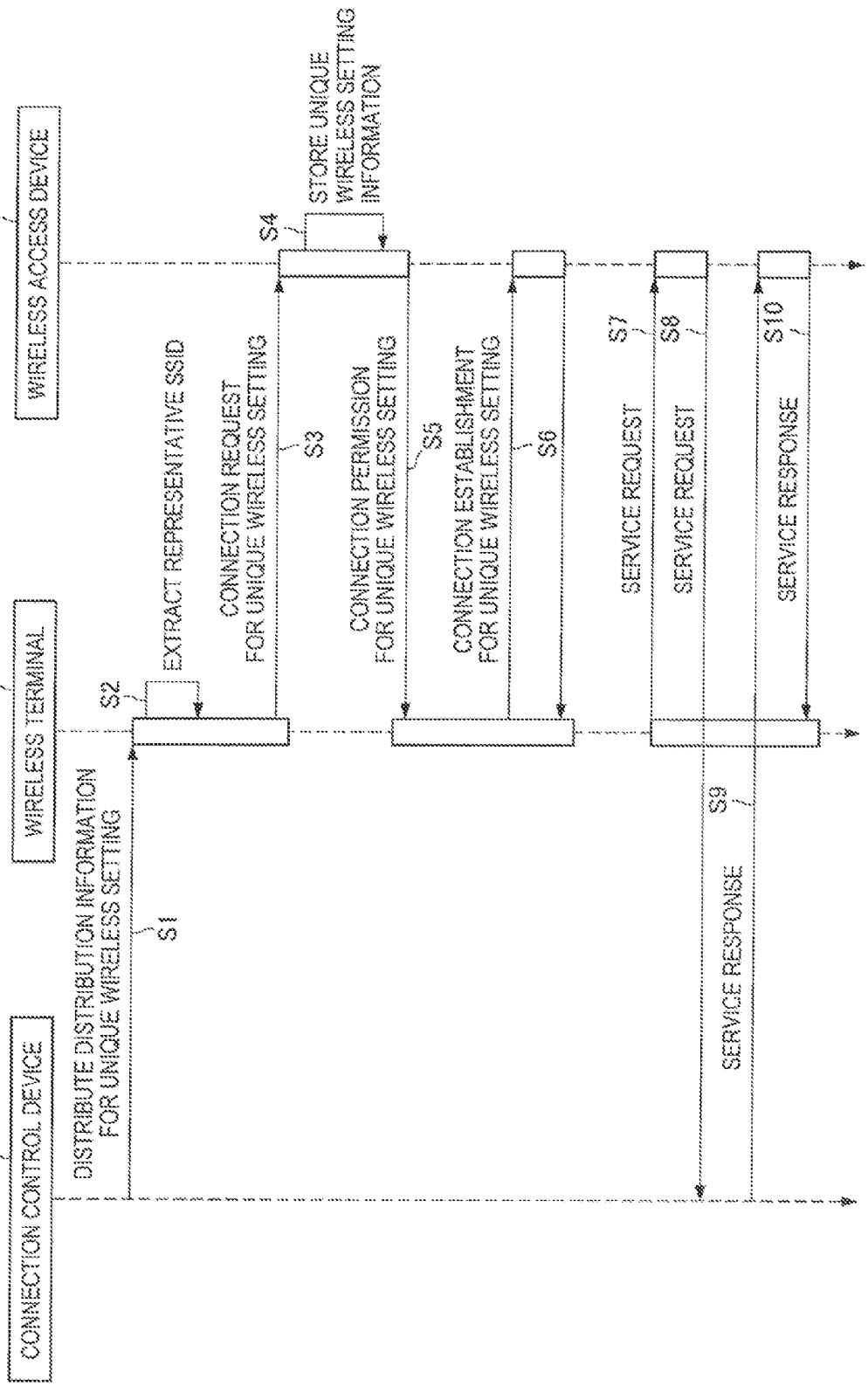
FIG. 5 is a sequence diagram showing a flow of operation performed by the wireless communication system.

Hereinafter, there will be described a flow of operation performed by the wireless communication system 1 having the above-mentioned configuration. FIG. 5 is a sequence diagram showing a flow of operation performed by the wireless communication system 1. Note that, for example, in the case where the connection control devices 10 are installed within a small area, intensity of a radio wave output from each connection control device 10 may be set to the minimum necessary. With such setting, the operation may be performed in the following order: first, the wireless terminal 20 receives a wireless signal from the connection control device 10; and after that, the wireless access device 30 receives a wireless signal from the wireless terminal 20.

Figure 6:
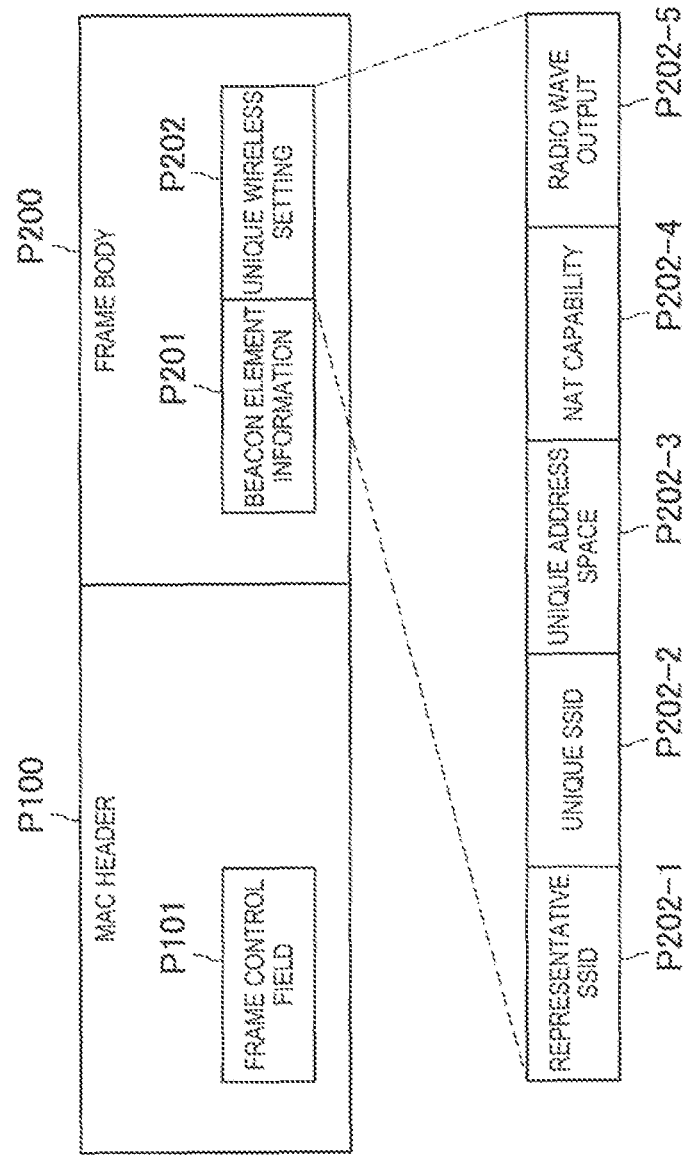
FIG. 6 is a diagram showing a configuration example of distribution information.

First, the distribution information acquisition part 13 of the connection control device 10 acquires distribution information. The distribution information may be, for example, in the case of being registered in the storage 14 by operation performed by an administrator of the connection control device 10 in advance, acquired from the storage 14. FIG. 6 is a diagram showing a configuration example of distribution information. The type of distribution information is not particularly limited, and may be, as shown in FIG. 6, the type of the beacon used in a wireless LAN, for example.

As shown in FIG. 6, a beacon used in the wireless LAN includes a media access control (MAC) header P100 which holds a frame control field P101 in which "beacon" is set as a type of frame, and a frame body P200. The frame body P200 includes a beacon element information P201 and a unique wireless setting P202. A technique of adding additional information to the beacon is described in JP 2011-176417A, for example.

The distribution information includes at least a network identifier and device identification information for identifying a wireless access device 30. As the network identifier, a service set identifier (SSID) can be used, for example, and the network identifier is not limited to the SSID, and may be an extended service set identifier (ESSID), for example. In the example shown in FIG. 6, a unique SSID (P202-2) is used as an example of the network identifier. Hereinafter, description will be made on the case where the unique SSID (P202-2) is used as an example of the network identifier. Example, the unique SSID (P202-2) is a network identifier that identifies the wireless communication area of the connection control device 10.

As the device identification information for identifying a wireless access device 30, an SSID can be used, for example, and the device identification information for identifying a wireless access device 30 is not limited to the SSID, and may be an ESSID. In the example shown in FIG. 6, a representative SSID (P202-1) is used as an example of the device identification information for identifying a wireless access device 30. Hereinafter, description will be made on the case where the representative SSID (P202-1) is used as an example of the device identification information.

The information included in the distribution information is not limited to those. For example, the distribution information may include segment identification information for identifying a virtual segment used for wireless communication performed by the wireless terminal 20 in the network 40. The virtual segment is, for example, a virtual segment using a virtual LAN (VLAN). In the example shown in FIG. 6, a unique address space P202-3 is used as an example of the segment identification information for identifying a virtual segment used for wireless communication performed by the wireless terminal 20 in the network 40. Hereinafter, description will be made on the case where the unique address space P202-3 is used as an example of the segment identification information for identifying a virtual segment.

Further, for example, the distribution information may include communication control information for controlling communication via the network 40. The communication control information is not particularly limited, and in the example shown in FIG. 6, an NAT capability P202-4 is used as an example of the communication control information for controlling communication via the network 40. Hereinafter, description will be made on the case where the NAT capability P202-4 is used as an example of the communication control information.

Here, the NAT capability P202-4 indicates whether it is possible to perform communication carrying out translation between a global address and a private address in the network 40, and when it is NAT-incapable, the connection from the wireless terminal 20 to the network 40 through the wireless access device 30 is restricted. Further, when it is NAT-capable, the connection from the wireless terminal 20 to the network 40 through the wireless access device 30 is permitted.

Note that, as in the case of using the NAT capability P202-4, the communication control information may be set in a manner that any one of the case of restricting the communication through the network 40 or the case of permitting the communication through the network 40 is shown, and there may also be set information indicating a degree of restriction in the case of restricting the communication through the network 40. The information indicating the degree of restriction may be information indicating that a physical connection to the network 40 is prohibited, for example, or may be information indicating that a physical connection to the network 40 is permitted but a logical connection to the network 40 is prohibited.

Further, for example, the distribution information may include intensity of a radio wave used for wireless communication. The radio wave intensity is not particularly limited, and in the example shown in FIG. 6, a "radio wave output P202-5" is used as an example of the intensity of a radio wave used for wireless communication. Although the radio wave output is information indicating intensity of a transmission radio wave, receiving sensitivity may be used instead of radio wave output, as information indicating the sensitivity to a reception radio wave. Hereinafter, description will be made on the case where the radio wave output P202-5 is used as an example of the radio wave intensity.

Further, hereinafter, description will be made on the case where the distribution information includes all of the device identification information, the network identifier, the segment identification information, the communication control information, and the radio wave intensity. However, the distribution information may not include all of those pieces of information, as long as including at least the device identification information and the network identifier.

The time of transmitting the distribution information is not particularly limited. For example, the distribution information may be transmitted continuously from the wireless transmitter/receiver 12. Alternatively, for example, the distribution information may be transmitted from the wireless transmitter/receiver 12 while an area (for example, shop) in which the connection control device 10 is installed is open, and may not be transmitted from the wireless transmitter/receiver 12 while the area is closed. In more detail, for example, in the case where the connection control device 10 is connected to another computer (for example, computer installed in the same area) via the LAN and the computer transmits a signal indicating that the area is open, the wireless transmitter/receiver 12 may transmit the distribution information while the signal is being received.

Further, for example, in the case where the connection control device 10 is connected to another computer (for example, computer installed in the same area) via the LAN and the computer transmits a start signal indicating the opening of the area, the wireless transmitter/receiver 12 may transmit the distribution information in the case where the start signal is received. Further, in the case where the computer transmits an end signal indicating the closing of the area, the wireless transmitter/receiver 12 may terminate the transmission of the distribution information in the case where the end signal is received.

Next, the wireless transmitter/receiver 12 transmits the distribution information acquired by the distribution information acquisition part 13. In the example shown in FIG. 5, the wireless transmitter/receiver 12 distributes the distribution information for a unique wireless setting (Step S1). When the wireless transmitter/receiver 22 of the wireless terminal 20 receives the distribution information, the extraction part 23 extracts the representative SSID (P202-1) from the distribution information (Step S2), and in addition thereto, also extracts the unique SSID (P202-2), the unique address space P202-3, the NAT capability P202-4, and the radio wave output P202-5.

Next, the wireless transmitter/receiver 22 transmits the unique SSID (P202-2), the unique address space P202-3, the NAT capability P202-4, and the radio wave output P202-5, which are extracted by the extraction part 23, as a connection request for the unique wireless setting, to the wireless access device 30 identified by the representative SSID (P202-1) (Step S3).

Next, when the wireless transmitter/receiver 32 of the wireless access device 30 receives the connection request for the unique wireless setting, the setting processing part 33 extracts various types of information from the connection request for the unique wireless setting. The extracted various types of information may be stored in the storage 34 as unique wireless setting information (Step S4). FIG. 7 is a diagram showing a configuration example of unique wireless setting information.

The setting processing part 33 sets a logical network identified by the unique SSID (P202-2). The logical network set in this way is used for wireless communication performed by the wireless terminal 20. Further, the setting processing part 33 sets a virtual segment identified by the unique address space P202-3. In addition, the setting processing part 33 adjusts radio wave intensity used for the wireless communication based on the radio wave output P202-5. Note that the adjustment of the radio wave intensity based on the radio wave output P202-5 may be performed for each wireless access device 30, or may be performed for each logical network to be set.

Next, the setting processing part 33 performs connection permission for the unique wireless setting (Step S5), and establishes connection for the unique wireless setting with the wireless terminal 20 (Step S6). For example, when the connection permission or the connection establishment is performed, a passphrase for encoding information that is communicated between the connection control device 10 and the wireless access device 30 may be transmitted/received between the connection control device 10 and the wireless access device 30.

After the connection is established, the communication between the connection control device 10 and the wireless terminal 20 can be performed through the wireless access device 30. For the communication in this case, the logical network and the virtual segment set by the setting processing part 33 are used. Further, the wireless signal intensity output from the antenna 31 is intensity that has been adjusted by the setting processing part 33. The communication through the network 40 caused by the communication between the connection control device 10 and the wireless terminal 20 is controlled based on the NAT capability P202-4.

For example, when an input of operation for selecting a service (for example, content distribution service) from a user is accepted by the input part 26, the control part 25 of the wireless terminal 20 transmits via the wireless transmitter/receiver 22 a service request whose unique SSID is specified (Step S7). The service request is received by the wireless transmitter/receiver 32 of the wireless access device 30.

The communication control part 35 of the wireless access device 30 transmits the service request to the connection control device 10 via the wireless transmitter/receiver 32 (Step S8). When the service request is received by the wireless transmitter/receiver 12, the control part 15 of the connection control device 10 transmits a service response as a response to the service request to the wireless access device 30 via the wireless transmitter/receiver 12 (Step S9). The service response is received by the wireless transmitter/receiver 32 of the wireless access device 30.

The communication control part 35 of the wireless access device 30 transmits the service response to the wireless terminal 20 via the wireless transmitter/receiver 32 (Step S10). The service response may be output by the output part 27. As long as it is after the setting of the logical network using the unique SSID is performed by the wireless access device 30, the operation can be realized by specifying the unique SSID in the service request and the service response.

In this way, when the setting of the logical network using the unique SSID is performed by the wireless access device 30, by specifying the unique SSID in the service request and the service response, the service request and the service response can be transmitted/received between the connection control device 10 and the wireless terminal 20 even though the connection control device 10 and the wireless terminal 20 do not directly communicate with each other. With such a configuration, even when the number of connection control devices 10 increases, deterioration in communication quality between the wireless access device 30 and the wireless terminal 20 can be reduced.

Although FIG. 5 shows an example in which the wireless terminal 20 transmits the service request and the connection control device 10 sends back the service response, the connection control device 10 may transmit the service request and the wireless terminal 20 may sends back the service response. Also in this case, the service request and the service response are transmitted/received between the connection control device 10 and the wireless terminal 20 through the wireless access device 30. Further, in the case where no service is prepared by a tenant, for example, the service request and the service response are not transmitted/received.

Note that, in the example shown in FIG. 5, the connection request for the unique wireless setting is sent from one connection control device 10 to the wireless access device 30, but there is assumed a case where the connection request for the unique wireless setting is sent from each of multiple connection control devices 10 to the wireless access device 30. In this case, the setting processing part 33 may use the unique SSID's transmitted from the respective connection control devices 10 as a multi-SSID, and may assign a virtual segment corresponding to each unique SSID. Accordingly, it becomes possible to process connection requests sent from the multiple connection control devices 10 to the wireless terminal 20, and to integrate multiple unique wireless environments.

[Explanation of Modified Example]

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, although the unique wireless setting P202 is included in the frame body P200 of the beacon of the wireless LAN in the example described above, the unique wireless setting P202 may also be included in an SSID of which the wireless access device 30 is notified by the connection control device 10. In this case, the extraction part 23 of the wireless terminal 20 may extract the unique wireless setting P202 from the SSID.

In the case where the NAT capability P202-4 is NAT-incapable and there are multiple wireless access devices 30, the setting processing part 33 may check operability of a network port device using the external network communication part 36. For example, the setting processing part 33 may check that physical connection of the network port device to the network 40 is not established. With the check, operation can be performed without individually changing a representative SSID and making the representative SSID known. It is particularly effective for a tenant which desires for strict security, such as a financial institution of an in-store branch inside a shopping mall.

Further, although there has been described an example in which the representative SSID (P202-1), the unique SSID (P202-2), the unique address space P202-3, the NAT capability P202-4, and the radio wave output P202-5 are included in the unique wireless setting P202, another piece of information may also be included therein. For example, a version (for example, IPv4 or IPv6) of an IP protocol for establishing connection with the network 40 may be included in the unique wireless setting P202. In this case, the communication via the network 40 performed by the wireless terminal 20 may be carried out using the IP protocol of that version.

According to the wireless communication system of the present embodiment, when the setting of the logical network using the unique SSID is performed by the wireless access device 30, by specifying the unique SSID in the service request and the service response, the service request and the service response can be transmitted/received between the connection control device 10 and the wireless terminal 20 even though the connection control device 10 and the wireless terminal 20 do not directly communicate with each other. Further, the connection control device 10 and the wireless access device 30 can be connected with each other via a wired LAN, and with such a configuration, deterioration in communication quality between the connection control devices 10 and the wireless terminal 20 can be reduced, even under the situation where the number of connection control devices 10 is increased.

Further, for example, in the case where there are too many wireless LAN access points within limited space, the possibility can be reduced that the situation may occur where a wireless terminal is connected to an unintended spot by automatic switchover or the like based on the priority order or radio wave intensity of wireless LAN access points. Further, the following possibility can also be reduced: the situation may occur where a connection established between a wireless LAN access point and a wireless terminal at one location is maintained even after the wireless terminal is moved to another location. Further, it becomes possible for a user to connect the wireless terminal to a wireless LAN as intended by the user, or to intentionally connect the wireless terminal to the wireless LAN access point that provides a special service desired by the user.

Further, it is expected that the cost of using a service and a service to be provided will differ for each wireless LAN access point, and it becomes possible to control, under the situation where multiple wireless LAN access points are present, connection and disconnection of each of the multiple wireless LAN access points to the wireless terminal for each location of the wireless terminal.

According to the wireless communication system of the present embodiment, for example, a lot of tenants and event traders can individually provide respective customers with services of wireless LAN (for example, Wi-Fi), or can use the services by themselves, in public spaces such as an airport and a shopping mall. Further, the wireless communication system of the present embodiment is applied not only to public spaces, but also applied effectively to offices, small-scale exhibition rooms, and the like.

Note that, in the present specification, the steps written in the sequence diagram may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

What is claimed is:

1. A wireless access device comprising:
   a receiver configured to receive a wireless signal including unique wireless setting information that has been transmitted from a wireless terminal configured to acquire a network identifier from a frame body field of distribution information wirelessly received from a connection control device; and
   a setting processing part configured to extract the unique wireless setting information from the wireless signal received by the receiver and to set a logical network that is identified by the network identifier and used for wireless communication performed by the wireless terminal; and
   a communication control part configured to control communication that uses the logical network between the connection control device and the wireless terminal,
   wherein the unique wireless setting information includes
      the network identifier for setting the logical network identified by a network identifier;
      segment identification information for identifying a virtual segment;
      communication control information for performing network address translation to control communication via an external network; and
      radio wave intensity information,
   wherein the network identifier includes a unique SSID,
   wherein when the receiver receives a service request transmitted from the wireless terminal using the unique SSID, the communication control part controls a wireless transmitter to transmit the service request to the connection control device, and
   wherein when the receiver receives a service response as a response to the service request transmitted from the connection control device, the communication control part controls the wireless transmitter to transmit the service response to the wireless terminal using the unique SSID.

2. The wireless access device according to claim 1,
   wherein the receiver receives the wireless signal transmitted from a wireless terminal, and
   wherein the setting processing part sets the logical network used for wireless communication performed by the wireless terminal.

3. The wireless access device according to claim 2, wherein the virtual segment is used for wireless communication performed by the wireless terminal on the external network.

4. The wireless access device according to claim 2, further comprising:
   an external network communication part configured to communicate via the external network; and
   a communication control part configured to control communication via the external network which takes place in wireless communication performed by the wireless terminal based on the communication control information.

5. The wireless access device according to claim 2, wherein the setting processing part adjusts radio wave intensity used for wireless communication based on the radio wave intensity information.

6. A wireless terminal for use with a wireless access device that sets a logical network identified by a network identifier, said wireless terminal comprising:
   a receiver configured to wirelessly receive distribution information from a connection control device, the distribution information including the network identifier and device identification information for identifying the wireless access device;
   an extraction part configured to extract the network identifier, the device identification information and unique wireless setting information from a frame body field of the distribution information received by the receiver;
   a transmitter configured to transmit a wireless signal including the network identifier extracted by the extraction part to the wireless access device identified by the device identification information extracted by the extraction part, and
   a control part configured to control communication with the connection control device via the logical network after the wireless access device sets the logical network identified by the network identifier,
   wherein the wireless access device is spaced apart from the connection control device,
   wherein the unique wireless setting information includes communication control information for performing network address translation to control communication via an external network,
   wherein the network identifier includes a unique SSID,
   wherein the transmitter is configured to transmit a service request to the wireless access device using the unique SSID, and wherein the receiver is configured to receive a service response from the connection control device via the wireless access device, the service response being a response to the service request, and the service response using the unique SSID.

7. A non-transitory computer-readable medium storing a program for causing a computer to function as a wireless terminal including an extraction part configured to extract a network identifier, unique wireless setting information, and device identification information for identifying a wireless access device from a frame body field of distribution information which is wirelessly received from a connection control device, and a communication control part configured to control a transmitter to transmit a wireless signal including the network identifier extracted by the extraction part to a wireless access device identified by the device identification information extracted by the extraction part, the wireless access device setting a logical network that is identified by the network identifier, a control part configured to control communication with the connection control device via the logical network after the wireless access device sets the logical network identified by the network identifier, wherein the computer is spaced apart from the wireless access device, wherein the unique wireless setting information includes communication control information for performing network address translation to control communication via an external network, wherein the network identifier includes a unique SSID, wherein the control part is configured to control a transmitter to transmit a service request to the wireless access device using the unique SSID, and wherein the control part is configured to control a receiver to receive a service response from the connection control device via the wireless access device, the service response being a response to the service request, and the service response using the unique SSID.

8. A wireless communication system comprising:
a connection control device;
a wireless terminal; and
a wireless access device,
wherein the connection control device includes
a transmitter configured to wirelessly transmit distribution information including a network identifier and device identification information for identifying a wireless access device,
wherein the wireless terminal includes
a receiver configured to wirelessly receive the distribution information from the connection control device,
an extraction part configured to extract the network identifier, the device identification information, and unique wireless setting information from a frame body field of the distribution information received by the receiver,
a transmitter configured to transmit a wireless signal including the network identifier extracted by the extraction part to a wireless access device identified by the device identification information extracted by the extraction part, the wireless access device setting a logical network that is identified by the network identifier, and
a control part configured to control communication with the connection control device via the logical network after the wireless access device sets the logical network identified by the network identifier, wherein the wireless access device is spaced apart from the connection control device, wherein the unique wireless setting information includes communication control information for performing network address translation to control communication via an external network, and wherein the wireless access device includes
a receiver configured to receive the wireless signal,
a setting processing part configured to extract the network identifier from the wireless signal received by the receiver and to set a logical network identified by the network identifier, and
a communication control part configured to control communication that uses the logical network between the connection control device and the wireless terminal, wherein the network identifier includes a unique SSID, wherein when the receiver receives a service request transmitted from the wireless terminal using the unique SSID, the control part controls a wireless transmitter to transmit the service request to the connection control device, and wherein when the receiver receives a service response as a response to the service request transmitted from the connection control device, the control part controls the wireless transmitter to transmit the service response to the wireless terminal using the unique SSID.

9. The wireless communication system according to claim 8, wherein the network identifier is an identifier for a wireless LAN and the device identification information identifies the wireless access device.

10. The wireless access device according to claim 1, wherein the network identifier is an identifier for a wireless LAN.

11. The wireless terminal according to claim 6, wherein the network identifier is an identifier for a wireless LAN and the device identification information identifies the wireless access device.

12. The wireless access device according to claim 1, wherein the segment identification information identifies a unique address space, and the communication control information is network address translation (NAT) capability information.

13. The wireless access device according to claim 12, wherein the unique SSID identifies a wireless communication area of a connection control device that communicates with the wireless access device.

* * * * *